(12) United States Patent
Kamiyama et al.

(10) Patent No.: US 9,925,490 B2
(45) Date of Patent: Mar. 27, 2018

(54) FLUE GAS TREATMENT DEVICE

(71) Applicant: MITSUBISHI HITACHI POWER SYSTEMS, LTD., Yokohama-shi, Kanagawa (JP)

(72) Inventors: Naoyuki Kamiyama, Tokyo (JP); Seiji Kagawa, Tokyo (JP); Toshihiro Fukuda, Tokyo (JP); Tetsu Ushiku, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 175 days.

(21) Appl. No.: 15/025,783

(22) PCT Filed: Jan. 22, 2015

(86) PCT No.: PCT/JP2015/051726
§ 371 (c)(1),
(2) Date: Mar. 29, 2016

(87) PCT Pub. No.: WO2015/115305
PCT Pub. Date: Aug. 6, 2015

(65) Prior Publication Data
US 2016/0243498 A1    Aug. 25, 2016

(30) Foreign Application Priority Data
Jan. 31, 2014   (JP) .................. 2014-018080

(51) Int. Cl.
*B01D 53/50*   (2006.01)
*B01D 53/56*   (2006.01)
(Continued)

(52) U.S. Cl.
CPC ........... *B01D 53/50* (2013.01); *B01D 53/501* (2013.01); *B01D 53/56* (2013.01); *B01D 53/64* (2013.01);
(Continued)

(58) Field of Classification Search
None
See application file for complete search history.

(56) References Cited

U.S. PATENT DOCUMENTS

2010/0071348 A1    3/2010   Kobayashi et al.

FOREIGN PATENT DOCUMENTS

JP    51-152043 U    12/1976
JP    61-35827 A    2/1986
(Continued)

OTHER PUBLICATIONS

Translation of Written Opinion dated Mar. 24, 2015, issued in counterpart Application No. PCT/JP2015/051726. (8 pages).
(Continued)

*Primary Examiner* — Walter D. Griffin
*Assistant Examiner* — Jelitza M Perez
(74) *Attorney, Agent, or Firm* — Westerman, Hattori, Daniels & Adrian, LLP (57) ABSTRACT

Provided are: an NOx removal unit to remove nitrogen oxide; an air preheater on a downstream side of the NOx removal unit to recover heat; a precipitator on a downstream side of the air preheater to remove ash dust; a gas-liquid contact type desulfurization unit on a downstream side of the precipitator to remove sulfur oxide; an $SO_3$ removing agent supply unit to supply an $SO_3$ removing agent at a supply unit on an upstream side of the precipitator; and a wet state processing unit between the air preheater and the supply unit to supply water to a flue gas to be made into a wet state; the wet state processing unit having a stand-up portion, a partition unit and a droplet supply unit.

17 Claims, 7 Drawing Sheets (51) Int. Cl.
  *B01D 53/86* (2006.01)
  *F23J 15/00* (2006.01)
  *F23J 15/04* (2006.01)
  *F23J 15/06* (2006.01)
  *F23L 15/04* (2006.01)
  *B01D 53/75* (2006.01)
  *B01D 53/64* (2006.01)

(52) U.S. Cl.
  CPC ............ *B01D 53/75* (2013.01); *F23J 15/003* (2013.01); *F23J 15/04* (2013.01); *F23J 15/06* (2013.01); *F23L 15/04* (2013.01); *B01D 53/869* (2013.01); *B01D 2251/404* (2013.01); *B01D 2251/602* (2013.01); *B01D 2251/604* (2013.01); *B01D 2251/606* (2013.01); *B01D 2257/302* (2013.01); *B01D 2257/404* (2013.01); *F23J 2215/10* (2013.01); *F23J 2215/20* (2013.01); *F23J 2219/10* (2013.01); *F23J 2219/60* (2013.01); *Y02E 20/348* (2013.01)

(56) References Cited

FOREIGN PATENT DOCUMENTS

| | | |
|---|---|---|
| JP | 4-135618 A | 5/1992 |
| JP | 4-300624 A | 10/1992 |
| JP | 9-141050 A | 6/1997 |
| JP | 10-118446 A | 5/1998 |
| JP | 10-272335 A | 10/1998 |
| JP | 2000-121032 A | 4/2000 |
| WO | 2008/078721 A1 | 7/2008 |

OTHER PUBLICATIONS

International Search Report dated Mar. 24, 2015, issued in counterpart International Application No. PCT/JP2015/051726 (2 pages).

Written Opinion dated Mar. 24, 2015, issued in counterpart International Application No. PCT/JP2015/051726 in Japanese (5 pages).

FIG.7

FLUE GAS TREATMENT DEVICE

FIELD

The present invention relates to a flue gas treatment device capable of following fluctuation of concentration of $SO_3$ in the flue gas.

BACKGROUND

For example, most part of sulfur oxide ($SO_x$) contained in a flue gas exhausted from a boiler of a power plant and the like is sulfur dioxide ($SO_2$), and a part of sulfur oxide is converted to sulfur trioxide ($SO_3$) by catalyst action of metal oxide carried with coexisting combustion ash and a denitration catalyst. In the related arts, since $SO_3$ has high reactivity and corrosivity, neutralization treatment is generally applied by injecting ammonia into a flue gas duct in order to prevent facility deterioration.

When sulfur (S) content originated from fuel in a thermal power plant is subjected to combustion in a boiler, sulfur is oxidized with a catalyst component in the fuel and a catalyst of an NOx removal unit, and then converted from a sulfur dioxide ($SO_2$) to a sulfur trioxide ($SO_3$) component. The converted $SO_3$ has concentration of about 30 to 50 ppm at maximum in a flue gas of a coal burning boiler, and may reach 180 ppm or so at maximum in the case of oil burn/heavy fuel depending on a contamination state in a furnace of the boiler and combustion conditions.

$SO_3$ in the flue gas causes troubles such as corrosion of an apparatus and blockage due to increased adherence of ash in a low-temperature facility located in a downstream of an air heater, and becomes a factor to increase maintenance cost of a power plant user.

Further, $SO_3$ is known as a typical component that causes blue smoke from a stack, and in the case where the blue smoke is highly dense, the plant may be forced to stop operation.

Considering above, in the related arts, some technologies are proposed as measures to remove this $SO_3$, besides introducing ammonia; for example, $SO_x$ is removed by spraying $CaCO_3$, $Ca(OH)_2$, $CaO$, etc., or spraying active carbon ((AC): porous impurity absorption material essentially containing carbon) into the flue gas duct (Patent Literatures 1 and 2).

CITATION LIST

Patent Literatures

Patent Literature 1: Japanese Laid-open Patent Publication No. 4-300624
Patent Literature 2: Japanese Laid-open Patent Publication No. 10-118446

SUMMARY

Technical Problem

Further, in the case of providing a gas-gas heater (GGH) inside a flue gas duct as a heat recovery device on an upstream side of an electronic precipitator, $SO_3(SO_2)$ may be removed by spraying powder of calcium carbonate ($CaCO_3$) into the flue gas duct as an $SO_3$ removing agent at an inlet portion of the GGH. According to this proposed technology, a flue gas containing $SO_3$ is guided to the GGH, and the flue gas is cooled inside the heat recovery device to a temperature lower than a sulfuric acid dew point (e.g., from 180° C. to 90° C.), and at the same time, powder of $CaCO_3$ having specified particle size distribution is sprayed to the flue gas duct at the inlet portion of the GGH heat recovery device, such that $SO_3$ mist condensed inside the GGH can adhere to powder surface ($CaCO_3$+ash) to remove $SO_3$.

Concentration of $SO_3$ fluctuates with time depending on a fuel property, contamination inside a boiler furnace, and an active state of a denitration catalyst. In the related arts, it is difficult to measure the concentration of $SO_3$ on-line. Therefore, the concentration of $SO_3$ is measured by chemical analysis during test run or maximum concentration of $SO_3$ is preliminarily assumed, and an excessive amount of $CaCO_3$ is sprayed relative to this $SO_3$ concentration. Due to this, in the case where the concentration of $SO_3$ is increased beyond the assumption by fluctuation of plant operating conditions, a $SO_3$ removal property is deteriorated owing to a shortage of a chemical agent, and there may be a problem in which pressure drop buildup and corrosion are accelerated by ash adhesion. In contrast, in the case where the concentration of $SO_3$ is inversely lower than the assumption, the chemical is excessively injected, and useless cost is invested.

Meanwhile, mercury emission control is enforced by Mercury and Air Toxics Standards (MATS) in USA as well as the Minamata Convention on Mercury. As a general method to reduce mercury, there is a known method of spraying active carbon into a flue gas duct, but utility cost for the active carbon (AC) required to remove mercury is extremely high, and it is economically disadvantageous that a consumption amount of the active carbon is largely increased in the case where the concentration of coexisting $SO_3$ is high. Therefore, it is desired to minimize a necessary amount of the active carbon to remove Hg by removing $SO_3$ additionally with a technology of spraying an alkaline agent.

Considering the above-described problems, the present invention is directed to providing a flue gas treatment device capable of supplying an appropriate amount of an $SO_3$ removing agent and following fluctuation of concentration of $SO_3$ in a flue gas.

Solution to Problem

The first aspect of the present invention to solve the problem is a flue gas treatment device, including: an NOx removal unit configured to remove nitrogen oxide contained in a flue gas flowing from a boiler; an air preheater configured to recover heat in a flue gas after removal of nitrogen oxide; a precipitator configured to remove ash dust contained in a flue gas after heat recovery; a gas-liquid contact type desulfurization unit configured to remove sulfur oxide contained in a flue gas after precipitation; a stack configured to exhaust a flue gas to the outside after desulfurization; an $SO_3$ removing agent supply unit configured to supply an $SO_3$ removing agent to a flue gas inside a flue gas duct at a supply unit located on an upstream side of the precipitator; and a wet state processing unit configured to supply, on a downstream side of the air preheater, water to a part of a flue gas to be made into a wet state inside a flue gas duct on the upstream side of the supply unit that supplies the $SO_3$ removing agent into a flue gas duct.

The second aspect is the flue gas treatment device according to the first aspect, wherein the wet state processing unit has: a stand-up portion standing in a direction orthogonal to the flue gas duct configured to exhaust the flue gas; a partition unit configured to partition the inside of the stand-up portion into a gas ascending passage and a gas descending passage; and a droplet supply unit configured to supply droplets onto the gas descending passage partitioned by the partition unit.

The third aspect is the flue gas treatment device according to the first aspect or the second aspect, wherein a hopper is provided on a lower side of the stand-up portion.

The fourth aspect is the flue gas treatment device according to any one of the first to third aspects, wherein desulfurization wastewater from the desulfurization unit or dehydrated filtrate is supplied to the wet state processing unit.

The fifth aspect is the flue gas treatment device according to any one of the first to fourth aspects, wherein an Hg removing agent supply unit configured to supply an Hg removing agent to a flue gas on an upstream side of the precipitator is provided.

The sixth aspect is the flue gas treatment device according to any one of the first to fifth aspects, wherein a return line configured to supply a part of precipitated ash containing the $SO_3$ removing agent collected by the precipitator to a flue gas in the vicinity of an area where the $SO_3$ removing agent is supplied on an upstream side of the precipitator is provided.

The seventh aspect is the flue gas treatment device according to any one of the first to sixth aspects, wherein a gas-gas heater is provided between the supply unit that supplies the $SO_3$ removing agent and the precipitator.

The eighth aspect is a flue gas treatment device, including: an NOx removal unit configured to remove nitrogen oxide contained in a flue gas flowing from a boiler; an air preheater configured to recover heat in a flue gas after removal of nitrogen oxide; a gas-gas heater configured to perform heat exchange of heat of a flue gas after heat recovery; a precipitator configured to remove ash dust contained in a flue gas after heat recovery; a gas-liquid contact type desulfurization unit configured to remove sulfur oxide contained in a flue gas after precipitation; a stack configured to exhaust a flue gas to the outside after desulfurization; an $SO_3$ removing agent supply unit configured to supply an $SO_3$ removing agent in a flue gas inside a flue gas duct at a supply unit located on a downstream side of the air preheater and located on an upstream side of the gas-gas heater; and a wet state processing unit configured to supply water to a part of a flue gas to be made into a wet state inside a flue gas duct located on a downstream side of the gas-gas heater and located on an upstream side of the precipitator.

The ninth aspect is the flue gas treatment device according to the eighth aspect, wherein the wet state processing unit has: a stand-up portion standing in a direction orthogonal to the flue gas duct configured to exhaust the flue gas; a partition unit configured to partition the inside of the stand-up portion into a gas ascending passage and a gas descending passage; and a droplet supply unit configured to supply droplets onto the gas descending passage partitioned by the partition unit.

The tenth aspect is the flue gas treatment device according to the eighth or ninth aspect, wherein a hopper is provided on a lower side of the stand-up portion.

The eleventh aspect is the flue gas treatment device according to any one of the eighth to tenth aspects, wherein desulfurization wastewater from the desulfurization unit or dehydrated filtrate is supplied to the wet state processing unit.

The twelfth aspect is the flue gas treatment device according to any one of the eighth to eleventh aspects, wherein an Hg removing agent supply unit configured to supply an Hg removing agent to the flue gas on an upstream side of the precipitator is provided.

The thirteenth aspect is the flue gas treatment device according to any one of the eighth to twelfth aspects, wherein a return line configured to supply a part of precipitated ash containing the $SO_3$ removing agent collected by the precipitator to a flue gas in the vicinity of an area where the $SO_3$ removing agent is supplied on an upstream side of the precipitator is provided.

Advantageous Effects of Invention

According to the present invention, the wet state is actively formed by supplying water to the flue gas in the area where the $SO_3$ removing agent is supplied. Therefore, a temperature gradient is generated with intermediation of water on an interface in the vicinity of a powder surface of the supplied $SO_3$ removing agent, and chemical reaction to absorb $SO_3$ contained in the flue gas can be actively accelerated on the powder surface of the $SO_3$ removing agent.

DESCRIPTION OF EMBODIMENTS

Preferred embodiments of the present invention will be described in detail below with reference to the attached drawings. Note that the present invention is not limited to the embodiments and intended to include configurations in which the respective embodiments are combined in the case where there is a plurality of embodiments.

First Embodiment

Figure 1:
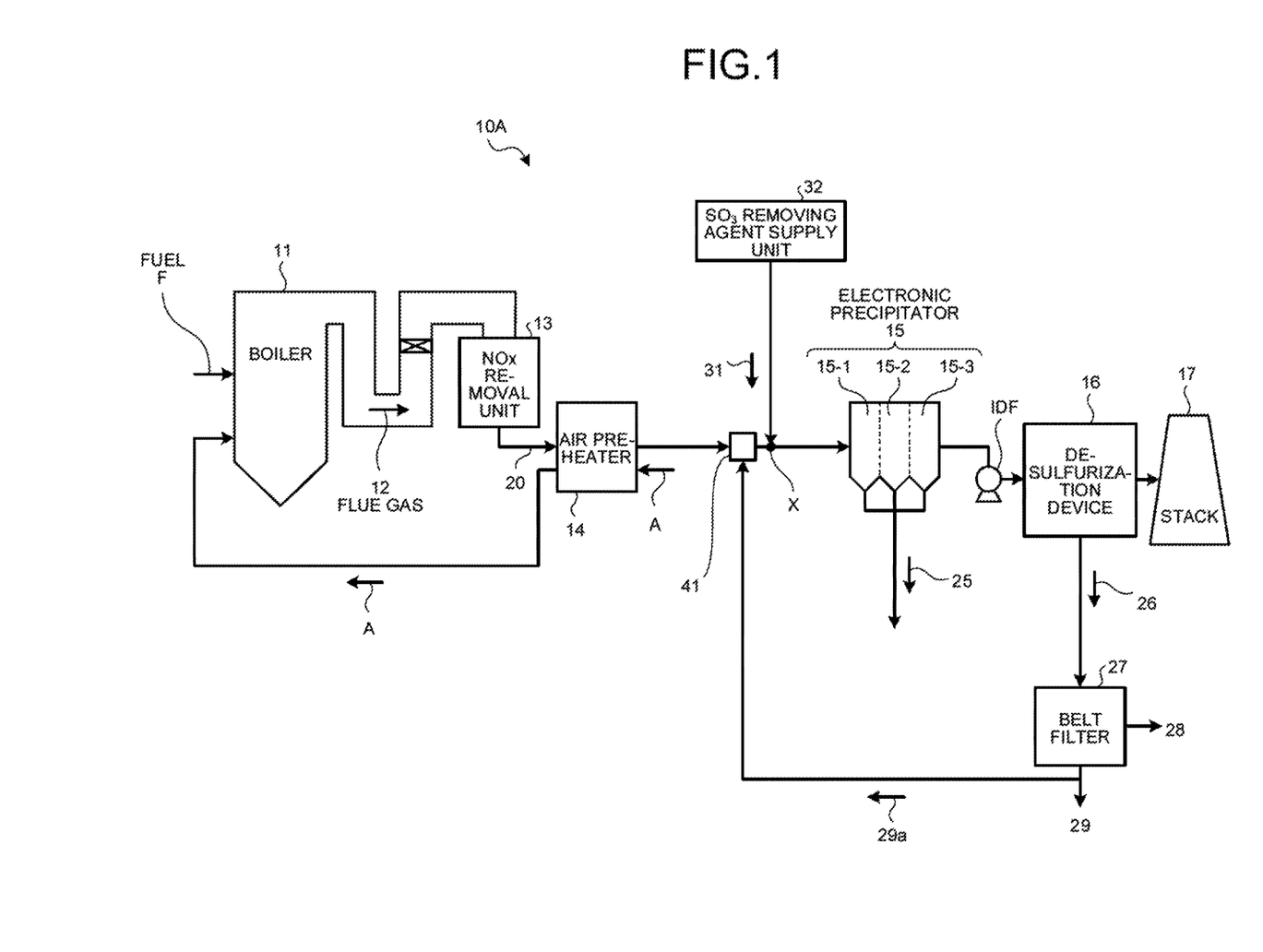
FIG. 1 is a schematic diagram illustrating a flue gas treatment device according to a first embodiment.

FIG. 1 is a schematic diagram illustrating a flue gas treatment device according to a first embodiment.

As illustrated in FIG. 1, a flue gas treatment device 10A according to the present embodiment includes: an NOx removal unit 13 that removes nitrogen oxide contained in a flue gas 12 flowing from a boiler 11; an air preheater 14 that recovers heat in the flue gas 12 after removal of nitrogen oxide; an electronic precipitator (hereinafter referred to as "precipitator") 15 that removes ash dust contained in the flue gas 12 after heat recovery; a gas-liquid contact type desulfurization unit 16 that removes sulfur oxide contained in the flue gas 12 after precipitation; a stack 17 that exhausts the flue gas to the outside after desulfurization; an $SO_3$ removing agent supply unit 32 that supplies an $SO_3$ removing agent 31 to the flue gas 12 inside a flue gas duct at a supply unit X located on an upstream side of the precipitator 15; and a wet state processing unit 41 on a downstream side of the air preheater 14 which supplies water a part of the flue gas 12 to be made into a wet state inside the flue gas duct 20 on the upstream side of the supply unit X that supplies the $SO_3$ removing agent 31 into the flue gas duct 20.

In FIG. 1, reference sign F represents a fuel supplied to the boiler, A represents air, 25 precipitated ash from the precipitator 15, 26 desulfurization wastewater, 27 a belt filter that separates gypsum 28 from the desulfurization wastewater 26, and 29 dehydrated filtrate obtained after separating the gypsum 28 at the belt filter 27.

In the present embodiment, a part 29a of the dehydrated filtrate 29 is used to the flue gas 12 as water supplied from the outside in the wet state processing unit 41 provided at the flue gas duct 20.

In the present embodiment, since the flue gas duct 20 is provided with the wet state processing unit 41 that makes a part of the flue gas into a wet state, an amount of water finely sprayed to the flue gas 12 is increased and further a gas temperature is decreased.

Here, in the present embodiment, a case of using calcium carbonate ($CaCO_3$) as the $SO_3$ removing agent will be described below.

Figure 2:
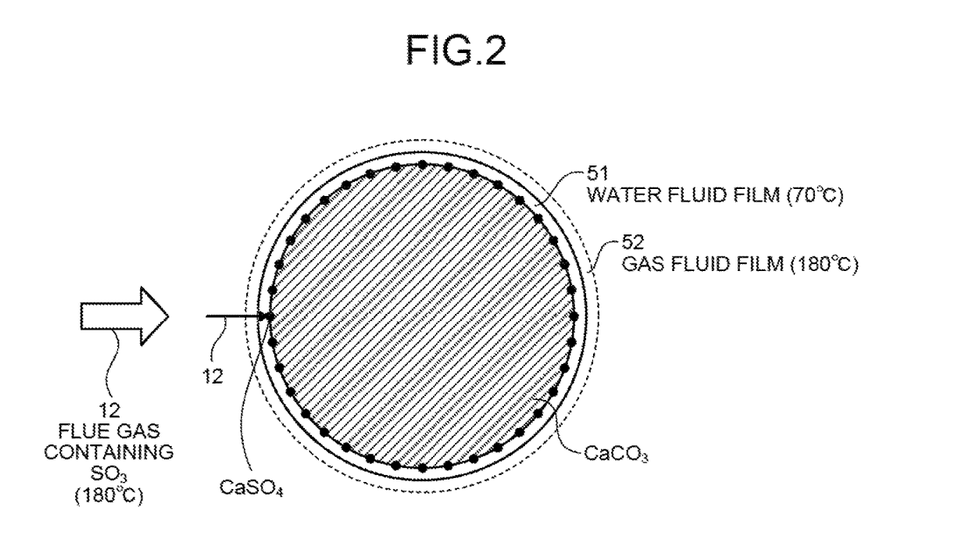
FIG. 2 is a schematic diagram illustrating calcium carbonate made into a wet state.

FIG. 2 is a schematic diagram illustrating calcium carbonate made into the wet state.

First, in the flue gas 12 having passed through the wet state processing unit 41, water sprayed into the flue gas 12 mediates in a state of an evaporation process. Therefore, when calcium carbonate ($CaCO_3$) is supplied to the flue gas 12 in this state, the flue gas 12 is made into a wet state by intermediation of water on a surface of calcium carbonate. Therefore, such intermediation of water tends to accelerate chemical reaction on the surface of calcium carbonate ($CaCO_3$) coated with a water fluid film 51.

Here, in the case where a gas temperature of the flue gas 12 having passed through the NOx removal unit 13 is, for example, 350° C., a gas temperature of the flue gas 12 becomes, for example, about 180° C. because the flue gas 12 has passed through the air preheater 14.

As illustrated in FIG. 2, a temperature of an outer surface gas fluid film 52 of the water fluid film 51 of which $CaCO_3$ is coated with the water fluid film 51 and made into the wet state is about 180° C. same as the gas temperature, and a temperature of the water fluid film 51 is about 70° C. (wet-bulb temperature of the water). This temperature difference generates a large temperature gradient between both of the fluid films.

Due to this temperature gradient, the temperature of the flue gas 12 containing gaseous $SO_3$ to contact calcium carbonate becomes lower than a temperature of a sulfuric acid dew point (140° C. to 150° C.).

As a result, $SO_3$ in the gas becomes mist-like condensed $SO_3$, and this mist-like condensed $SO_3$ is further converted to calcium sulfate ($CaSO_4$) by chemical reaction with calcium carbonate to be absorbed, thereby removing $SO_3$ from the inside of flue gas 12.

Thus, according to the present invention, the flue gas 12 is actively made into the wet state by supplying the part 29a of the dehydrated filtrate 29 in an area where calcium carbonate is supplied as the $SO_3$ removing agent 31. Therefore, the temperature gradient is generated with intermediation of water on the surface of the supplied calcium carbonate, and chemical reaction to convert $SO_3$ contained in the flue gas 12 to calcium sulfate is actively performed on the surface of calcium carbonate.

In contrast, in the case where the area calcium carbonate is supplied is not made into the wet state, the temperature gradient is not generated because there is no intermediation of water. As a result, the flue gas does not pass in a state of the sulfuric acid dew point, and only chemical reaction between the gaseous $SO_3$ and calcium carbonate progresses.

As a result, a supply amount of calcium carbonate can be largely reduced in the case of the present embodiment although a large amount of calcium carbonate is required to be supplied in the case of the related arts.

Meanwhile, in the present embodiment, the case of using calcium carbonate ($CaCO_3$) as the $SO_3$ removing agent has been described, but the present invention is not limited thereto, and the same effects can be obtained by using, for example, lime hydrate ($Ca(OH)_2$), quick lime (CaO), and the like.

Second Embodiment

Figure 3:
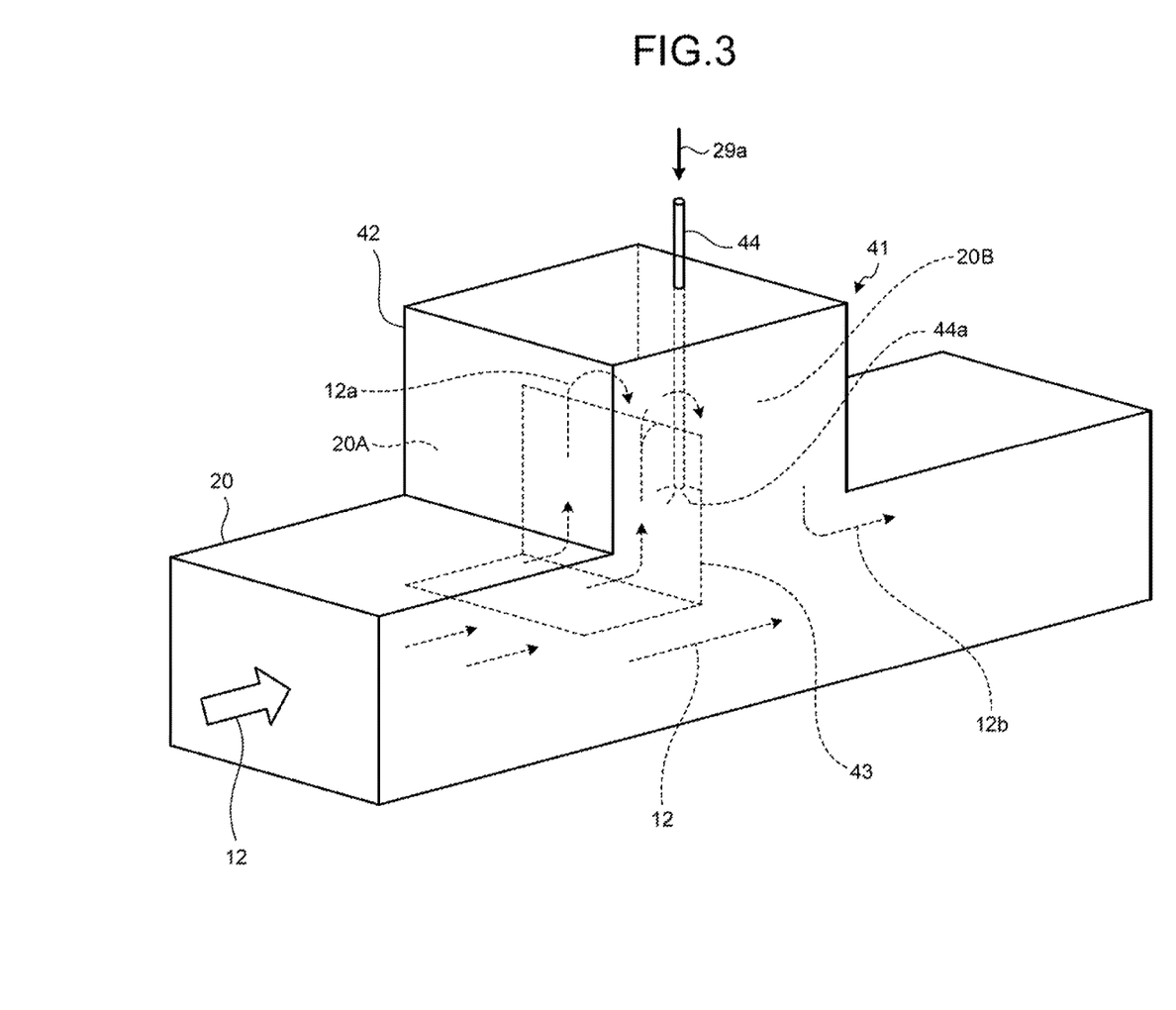
FIG. 3 is a schematic diagram of a flue gas duct according to a second embodiment.
Figure 4:
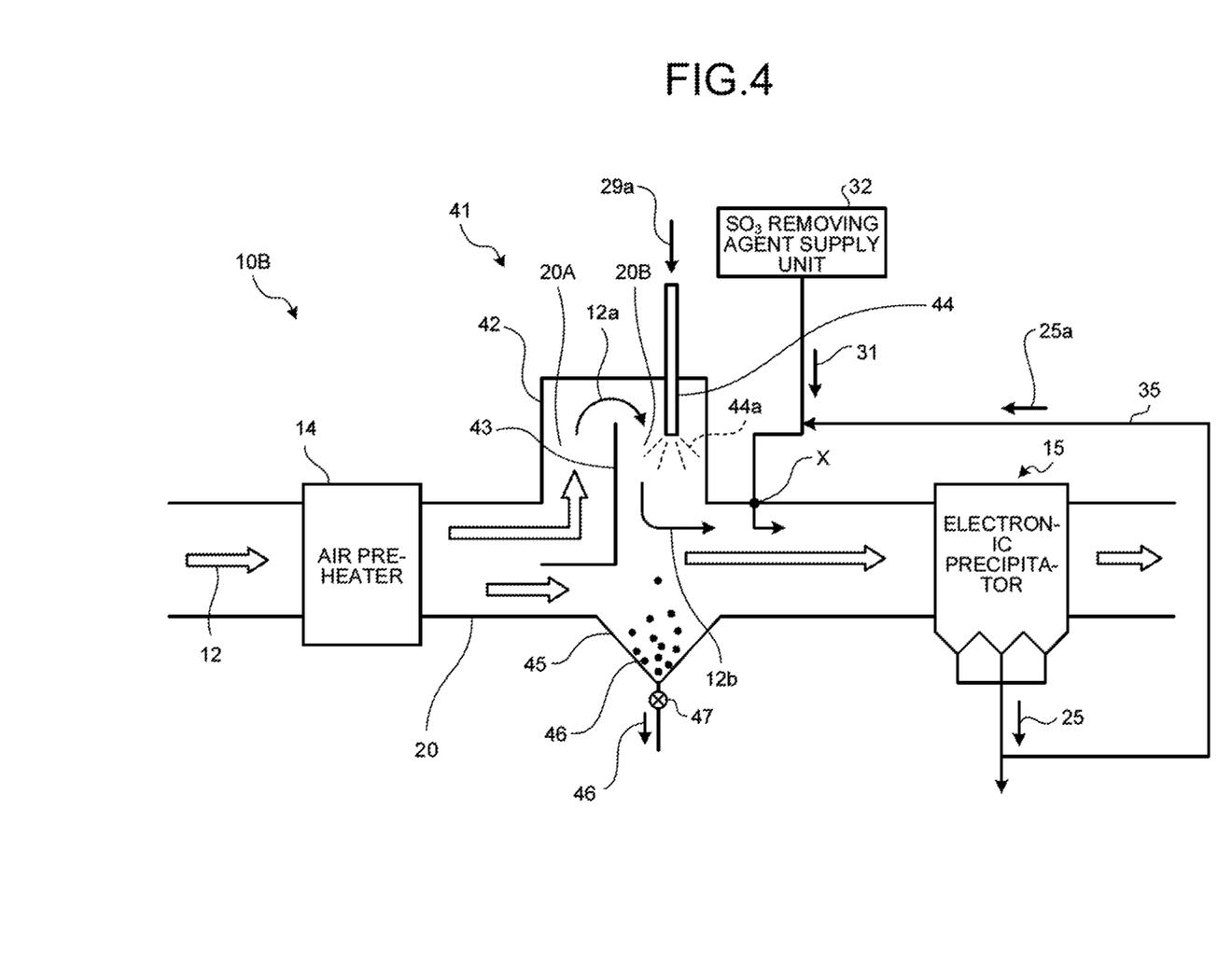
FIG. 4 is a schematic diagram illustrating a flow of a flue gas treatment device according to the second embodiment.
Figure 5:
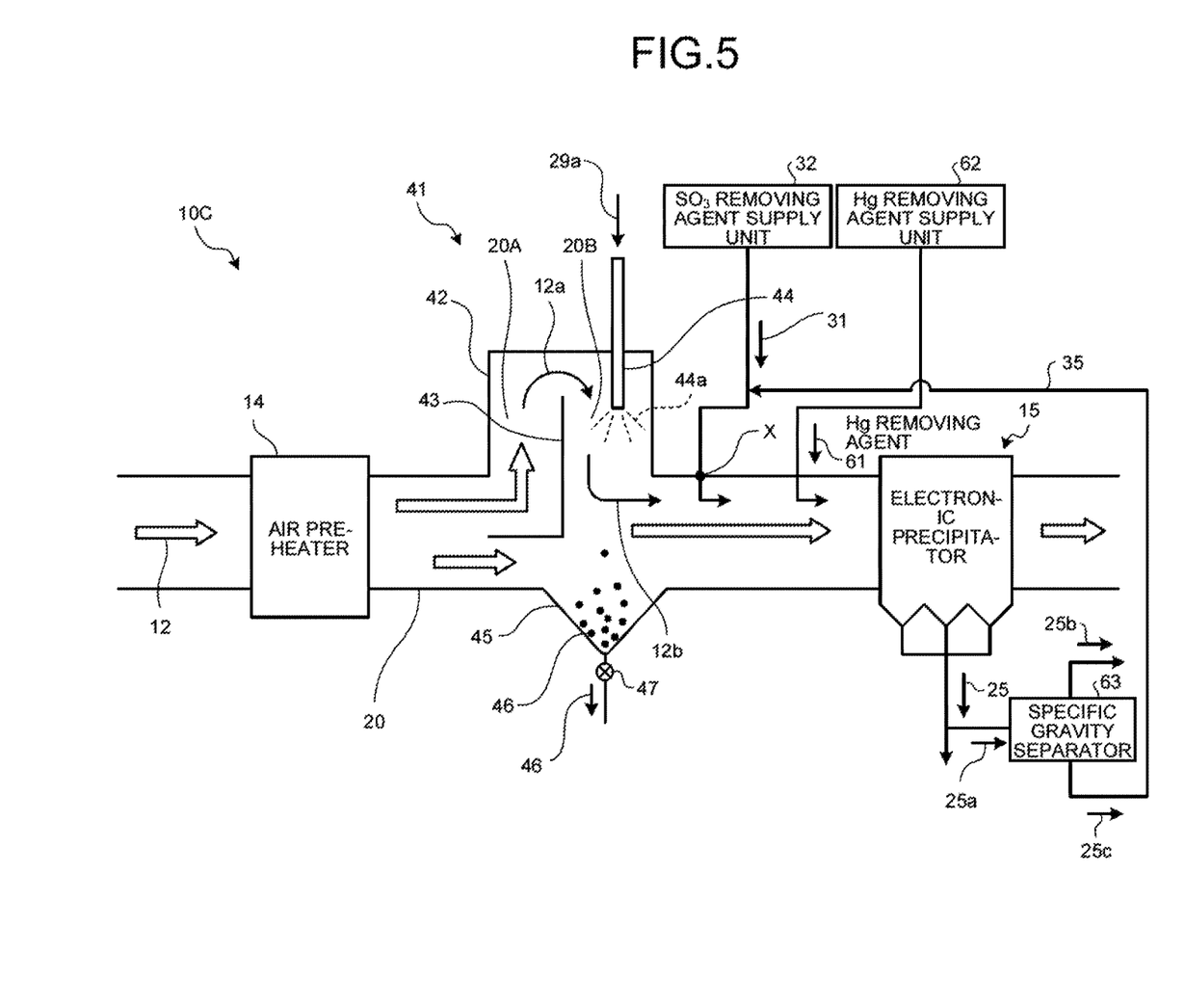
FIG. 5 is a schematic diagram illustrating a flue gas treatment device according to a third embodiment.

Next, a flue gas treatment device according to a second embodiment of the present invention will be described with reference to FIGS. 3 and 4. FIG. 3 is a schematic diagram of a flue gas duct according to the second embodiment. FIG. 4 is a schematic diagram illustrating a flow of the flue gas treatment device according to the second embodiment. Note that descriptions for members equivalent to those of a first embodiment will be omitted by denoting the members by the same reference signs. Here, FIG. 4 illustrates only a main portion of the flue gas treatment device illustrated in FIG. 1, and other parts are omitted (the same is applied in other embodiments described below).

As illustrated in FIGS. 3 and 4, a flue gas treatment device 10B according to the present embodiment includes: a stand-up portion 42 provided as a wet state processing unit 41 in a manner standing up in a direction orthogonal to a flue gas duct 20 that exhausts a flue gas 12 flowing from a boiler 11; an inverse L-shaped partition unit 43 that partitions the inside of the stand-up portion 42 into a gas ascending passage 20A and a gas descending passage 20B; a droplet supply unit 44 that supplies droplets 44a onto the gas descending passage 20B partitioned by the partition unit 43; and an $SO_3$ removing agent supply unit 32 that supplies an $SO_3$ removing agent 31 into the flue gas duct 20 at a supply unit X located on a downstream side of the droplet supply unit 44. Further, in the present embodiment, a return line 35 is provided to supply a part 25a of precipitated ash 25 to the flue gas 12 near an area on an upstream side of the precipitator 15 where the $SO_3$ removing agent 31 is supplied. The precipitated ash 25 containing the $SO_3$ removing agent 31 not yet reacted and having been collected by a precipitator 15 formed of three sections of 15-1 to 15-3 is combined with the $SO_3$ removing agent 31 supplied from the $SO_3$ removing agent supply unit 32 so as to be sprayed into the flue gas duct 20.

Meanwhile, in the present embodiment, supply of the part 25a of the precipitated ash 25 is combined with the $SO_3$ removing agent 31 and then sprayed into the flue gas duct 20, but the part 25a of the precipitated ash 25 may also be sprayed into the flue gas duct 20 individually via a different line.

In the present embodiment, because the flue gas duct is partitioned by the partition unit 43, a part 12a of the flue gas 12 passes through the gas ascending passage 20A and the gas descending passage 20B inside the stand-up portion 42. At the time of passing the gas descending passage 20B, dehydrated filtrate 29a is sprayed from the droplet supply unit 44, and droplets 44a are accompanied in a flue gas 12b. By this, the part 12a of the flue gas 12 is converted to the flue gas 12b in a wet state.

The droplet supply unit 44 is adapted to spray fine droplets by using a spray nozzle or the like to spray the dehydrated filtrate 29a. As the spray nozzle, a two-fluid nozzle or the like that can form fine droplets can be applied. However, the spray nozzle is not limited thereto.

The flue gas 12b that has been made into the wet state is combined with the flue gas 12 having passed through a lower side of the partition unit 43.

Further, in the present embodiment, a hopper 45 is provided on a bottom surface side of the flue gas duct 20 of the stand-up portion 42, and when the droplets 44a is sprayed, solids 46 adhered to the vicinity of the nozzle is prevented from falling and being accumulated inside the flue gas duct. Further, a rotary valve 47 is provided on a bottom portion of the hopper 45 such that the solids 46 can be periodically removed.

Here, exemplary substances forming the solids 46 can be salt-like substances obtained after evaporating Ca ions, $SO_4$ ions, Cl ions, and the like in the dehydrated filtrate 29a, and a mixture formed of a part of reacted gypsum carbonate/ calcium carbonate not yet reacted, and accompanied combustion ash.

In the present embodiment, when the droplets are sprayed, the droplets are sprayed onto the gas descending passage 20B of the stand-up portion 42, and are not sprayed in the same direction as a gas flow direction inside the flue gas duct 20 (horizontal direction in the drawing). In the case where the droplets are sprayed in the same direction, bulk solids 46 that adhere/fall down to a periphery of the nozzle and surrounding structures may be accumulated inside the flue gas duct and hinder droplets spraying operation. Therefore, the droplets 44a are thus sprayed along a descending flow of the stand-up portion in order to prevent such situations. Further, because the solids 46 adhered to the periphery of the nozzle may hinder formation of fine droplets, a soot removal device may be provided so as to drop the solids by intermittent hitting with a hammer, application of soot removing air, and so on.

Thus, as a result of preventing hindrance against formation of fine droplets, only fine droplets can be constantly fed in an axial direction of the flue gas duct 20 (horizontal direction in the drawing), and further influence of the solids 46 is eliminated when the $SO_3$ removing agent 31 supplied to a downstream side is made into the wet state. Note that the solids falls vertically and directly onto the hopper 45 provided on the bottom portion side of the flue gas duct 20.

As a result, since fine droplets are sprayed, calcium carbonate is made into the wet state by supplying calcium carbonate to the flue gas 12*b* containing the fine droplets.

As a result, the supplied calcium carbonate can be made into the wet state unlike a dried state in the related arts, and $SO_3$ contained in the flue gas 12 is absorbed and reactivity of chemical reaction is accelerated.

In the present embodiment, the dehydrated filtrate 29*a* is used as the water in droplets supply, but not limited thereto, for example, a part of desulfurization wastewater 26 before separating gypsum 28 may also be used. In this case, enrichment of gypsum slurry may be adjusted by using water.

Then, when calcium carbonate is supplied as the $SO_3$ removing agent 31 to the flue gas in the wet state, calcium carbonate is made into a wet state, and a removing property for $SO_3$ contained in the flue gas can be improved by chemical reaction as described in the first embodiment.

In the present embodiment, the part of precipitated ash 25 collected by an electronic precipitator 15 is returned to the flue gas duct again via a precipitated ash supply line.

This is because a large amount of calcium carbonate is supplied from the $SO_3$ removing agent supply unit 32, and calcium carbonate not yet reacted is collected in the precipitated ash 25. Therefore, this collected calcium carbonate not yet reacted is returned for reuse, and a supply amount of fresh calcium carbonate can be reduced by this. Further, a returning amount of the part of the precipitated ash containing calcium carbonate not yet reacted can be also reduced because the property for removing $SO_3$ contained in the flue gas by chemical reaction at the wet state processing unit 41 in a wet state can be improved.

Further, in the case where the concentration of $SO_3$ in the flue gas is monitored on the downstream side of an outlet of the electronic precipitator 15 (inlet of a desulfurization unit 16), an outlet of a stack 17, or the like, and increase of the concentration of $SO_3$ is detected, following countermeasures may be taken: 1) increase a supply amount of $CaCO_3$; 2) increase a recycle amount of the part 25*a* of the precipitated ash 25; and 3) suitably increase a spray amount of the dehydrated filtrate 29*a*.

In the case where the countermeasures of 1) and 2) are taken to increase the amounts, a load on the precipitator 15 is increased. Therefore, the supply amount of the dehydrated filtrate 29*a* is suitably increased so as to quickly handle the situation even in the case where the concentration of $SO_3$ in the flue gas 12 is increased.

As a result, fluctuation of the concentration of $SO_3$ in the flue gas can be followed.

Third Embodiment

Next, a flue gas treatment device according to a third embodiment, of the present invention will be described with reference to FIG. 5. FIG. 5 is a schematic diagram illustrating the flue gas treatment device according to the third embodiment. Note that descriptions for members equivalent to those of a first or second embodiment will be omitted by denoting the members by the same reference signs.

As illustrated in FIG. 5, in the flue gas treatment device 10C according to the present embodiment, an Hg removing agent supply unit 62 that supplies an Hg removing agent 61 to a flue gas on an upstream side of a precipitator 15 is further provided in the second embodiment, and mercury in the flue gas is removed and further $SO_3$ in the flue gas is removed. Note that the Hg removing agent is supplied on upstream side of the precipitator 15 and on a downstream side of a supply unit X that supplies an $SO_3$ removing agent 31 to a flue gas duct 20.

Here, as the Hg removing agent 61, active carbon (AC) can be exemplified.

In the present embodiment, concentration of $SO_3$ in the flue gas 12 is reduced by providing a wet state processing unit 41. Therefore, a necessary active carbon amount of the active carbon (AC) for Hg removal is reduced, and an additive amount of active carbon required for Hg removal can be minimized.

Further, in the present embodiment, a return line 35 that supplies, to the flue gas 12, separated materials 25*c* of the $SO_3$ removing agent 31 and the Hg removing agent 61 is provided, and a specific gravity separator 63 is provided on this return line. The specific gravity separator 63 separates, utilizing specific gravity, a part 25*a* of precipitated ash 25 containing the $SO_3$ removing agent 31 and the Hg removing agent 61 into fly ash 25*b* and separated materials 25*c* of the $SO_3$ removing agent 31 and the Hg removing agent 61. Further, the separated materials 25*c* of the $SO_3$ removing agent 31 and the Hg removing agent 61 are supplied to the flue gas 12, excluding the fly ash 25b obtained by specific gravity separation. By this, only the SO$_3$ removing agent 31 and the Hg removing agent 61 both not yet reacted can be reused at the time of removing SO$_3$ and removing Hg.

Fourth Embodiment

Figure 6:
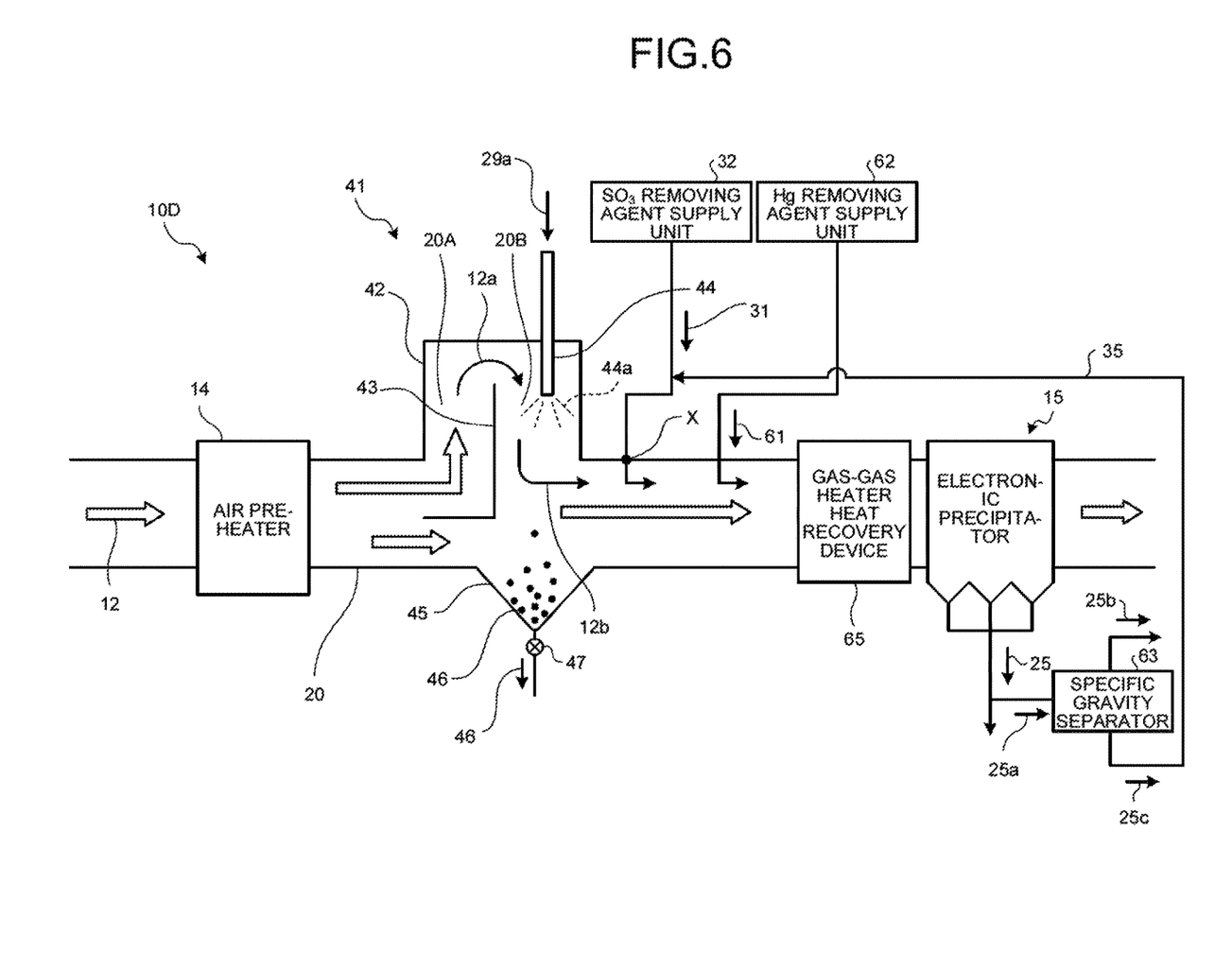
FIG. 6 is a schematic diagram illustrating a flue gas treatment device according to a fourth embodiment.

Next, a flue gas treatment device according to a fourth embodiment of the present invention will be described with reference to FIG. 6. FIG. 6 is a schematic diagram illustrating the flue gas treatment device according to the fourth embodiment. Note that descriptions for members equivalent to those of first to third embodiments will be omitted by denoting the members by the same reference signs.

As illustrated in FIG. 6, in a flue gas treatment device 10D of the present embodiment, a gas-gas heater (GGH) heat recovery device 65 is further provided on an upstream side of a precipitator 15 in the third embodiment, and recovers heat of a flue gas 12 and supplies a heat medium obtained after heat recovery for heating water to be supplied to a low-pressure supply water turbine side in order to, for example, improve power generation efficiency in a boiler. Then, the cooled heat medium is returned again to the gas-gas heater (GGH) heat recovery device 65 for circulation (circulation line is not illustrated).

When the flue gas passes through the gas-gas heater (GGH) heat recovery device 65, a flue gas temperature is further decreased. Therefore, condensed SO$_3$ mist in the flue gas 12 having passed through the gas-gas heater (GGH) heat recovery device 65 is made to react with calcium carbonate (CaCO$_3$) not yet reacted and accompanied in the flue gas, thereby further improving removing efficiency for SO$_3$.

Fifth Embodiment

Figure 7:
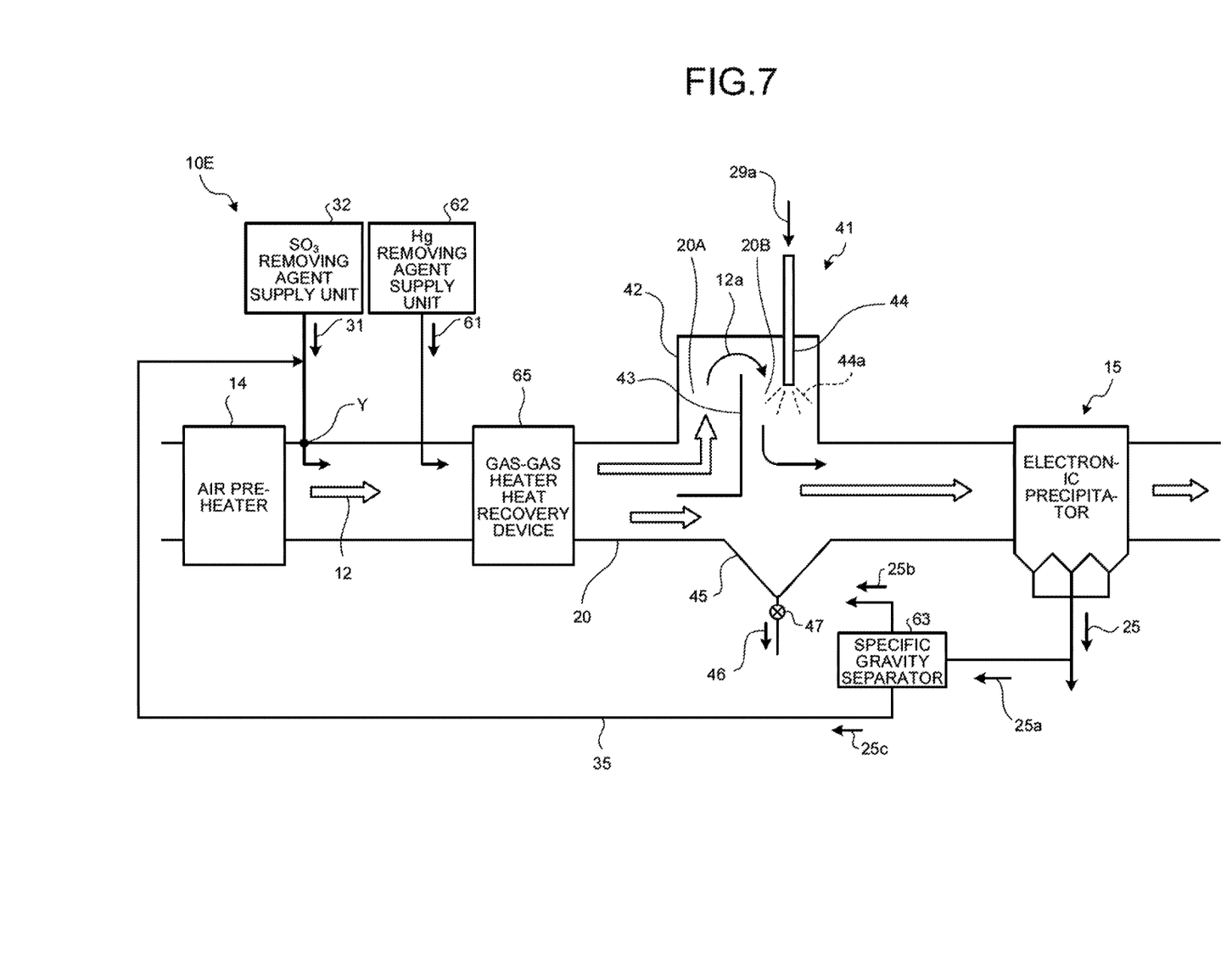
FIG. 7 is a schematic diagram illustrating a flue gas treatment device according to a fifth embodiment.

Next, a flue gas treatment device according to a fifth embodiment of the present invention will be described with reference to FIG. 7. FIG. 7 is a schematic diagram illustrating the flue gas treatment device according to the fifth embodiment. Note that descriptions for members equivalent to those of first to fourth embodiments will be omitted by denoting the members by the same reference signs.

As illustrated in FIG. 7, a flue gas treatment device 10E according to the present embodiment includes: an NOx removal unit 13 that removes nitrogen oxide contained in a flue gas 12 flowing from a boiler; an air preheater 14 that recovers heat in the flue gas 12 after removal of nitrogen oxide; a gas-gas heater (GGH) heat recovery device 65 that performs heat exchange of heat of the flue gas after heat recovery; a precipitator 15 that removes ash dust contained in the flue gas 12 after heat recovery; a gas-liquid contact type desulfurization unit 16 that removes sulfur oxide contained in the flue gas after precipitation, a stack 17 that exhausts the flue gas to the outside after desulfurization; an SO$_3$ removing agent supply unit 32 that supplies an SO$_3$ removing agent 31 to the flue gas inside the flue gas duct 20 at a supply unit Y located on a downstream side of the air preheater and located on an upstream side of the gas-gas heater (GGH) heat recovery device 65; and a wet state processing unit 41 that makes a part of the flue gas 12 into a wet state inside the flue gas duct 20 located on a downstream side of the gas-gas heater (GGH) heat recovery device 65 and located on an upstream side of the precipitator 15.

In the present embodiment, the flue gas 12 having passed through the gas-gas heater (GGH) heat recovery device 65 has a gas temperature of 100° C. because the wet state processing unit 41 is provided on the downstream side of the gas-gas heater (GGH) heat recovery device 65. However, SO$_3$ remaining in the flue gas having passed through the gas-gas heater (GGH) heat recovery device 65 is made to react with calcium carbonate not yet reacted by performing spraying into the flue gas 12 that has a temperature equal to a water dew point or higher, so as to further improve removing efficiency for SO$_3$.

REFERENCE SIGNS LIST 10A to E Flue gas treatment device
11 Boiler
12 Flue gas
13 NOx removal unit
14 Air preheater
15 Electronic precipitator (precipitator)
16 Desulfurization unit
26 Desulfurization wastewater
29 Dehydrated filtrate
31 SO$_3$ removing agent
32 SO$_3$ removing agent supply unit
41 Wet state processing unit
42 Stand-up portion
43 Partition unit
44 Droplet supply unit
44a Droplet

The invention claimed is:

1. A flue gas treatment device, comprising:
an NOx removal unit configured to remove nitrogen oxide contained in a flue gas flowing from a boiler;
an air preheater that is provided on a downstream side of the NOx removal unit and is configured to recover heat in a flue gas after removal of nitrogen oxide;
a precipitator that is provided on a downstream side of the air preheater and is configured to remove ash dust contained in a flue gas after heat recovery;
a gas-liquid contact type desulfurization unit that is provided on a downstream side of the precipitator and is configured to remove sulfur oxide contained in a flue gas after precipitation;
an SO$_3$ removing agent supply unit configured to supply an SO$_3$ removing agent to a flue gas inside a flue gas duct at a supply unit located on an upstream side of the precipitator; and
a wet state processing unit that is provided between the air preheater and the supply unit that supplies the SO$_3$ removing agent and is configured to supply-water to a flue gas to be made into a wet state inside the flue gas duct,
wherein the wet state processing unit includes a stand-up portion standing in a direction orthogonal to the flue gas duct configured to exhaust the flue gas, a partition unit configured to partition the inside of the stand-up portion into a gas ascending passage and a gas descending passage, and a droplet supply unit configured to supply droplets onto the gas descending passage partitioned by the partition unit.

2. The flue gas treatment device according to claim 1, wherein a hopper is provided on a lower side of the stand-up portion to remove solids in the flue gas duct.

3. The flue gas treatment device according to claim 1, comprising a line that extends from the desulfurization unit and supplies desulfurization wastewater from the desulfurization unit or dehydrated filtrate to the wet state processing unit.

4. The flue gas treatment device according to claim 1, comprising an Hg removing agent supply unit that is provided on an upstream side of the precipitator and is configured to supply air Hg removing agent to a flue gas.

5. The flue gas treatment device according to claim 1, comprising a return line that extends from the precipitator and is configured to combine a part of precipitated ash containing an $SO_3$ removing agent collected by the precipitator with the $SO_3$ removing agent from the $SO_3$ removing agent supply unit or a flue gas in the vicinity of the supply unit that supplies the $SO_3$ removing agent.

6. The flue gas treatment device according to claim 5, wherein the return line is provided with a specific gravity separator configured to separate the removing agents from the precipitated ash utilizing specific gravity.

7. The flue gas treatment device according to claim 1, comprising a gas-gas heater that is provided between the supply unit that supplies the $SO_3$ removing agent and the precipitator and is configured to perform heat exchange of heat of a flue gas after heat recovery.

8. The flue gas treatment device according to claim 1, wherein the droplet supply unit is provided with a soot removal device configured to drop solids adhered to a periphery of the droplet supply unit.

9. The flue gas treatment device according to claim 1, wherein a unit configured to detect a concentration of $SO_3$ in the flue gas is provided between the precipitator and the desulfurization unit.

10. A flue gas treatment device, comprising:
an NOx removal unit configured to remove nitrogen oxide contained in a flue gas flowing from a boiler;
an air preheater that is provided on a downstream side of the NOx removal unit and is configured to recover heat in a flue gas after removal of nitrogen oxide;
a gas-gas heater that is provided on a downstream side of the air preheater and is configured to perform heat exchange of heat of a flue gas after heat recovery;
a precipitator that is provided on a downstream side of the gas-gas heater and is configured to remove ash dust contained in a flue gas after heat exchange;
a gas-liquid contact type desulfurization unit that is provided on a downstream side of the precipitator and is configured to remove sulfur oxide contained in a flue gas after precipitation;
an $SO_3$ removing agent supply unit configured to supply an $SO_3$ removing agent in a flue gas inside a flue gas duct at a supply unit located on a downstream side of the air preheater and located on an upstream side of the gas-gas heater; and
a wet state processing unit that is provided between the gas-gas heater and the supply unit that supplies the $SO_3$ removing agent and is configured to supply water to a flue gas to be made into a wet state inside the flue gas duct,
wherein the wet state processing unit includes a stand-up portion standing in a direction orthogonal to the flue gas duct configured to exhaust the flue gas, a partition unit configured to partition the inside of the stand-up portion into a gas ascending passage and a gas descending passage, and a droplet supply unit configured to supply droplets onto the gas descending passage partitioned by the partition unit.

11. The flue gas treatment device according to claim 10, wherein a hopper is provided on a lower side of the stand-up portion to remove solids in the flue gas duct.

12. The flue gas treatment device according to claim 10, comprising a line that extends from the desulfurization unit and supplies desulfurization wastewater from the desulfurization unit or dehydrated filtrate to the wet state processing unit.

13. The flue gas treatment device according to claim 10, comprising an Hg removing agent supply unit that is provided on an upstream side of the precipitator and is configured to supply an Hg removing agent to a flue gas.

14. The flue gas treatment device according to claim 10, comprising a return line that extends from the precipitator and is configured to combine a part of precipitated ash containing an $SO_3$ removing agent collected by the precipitator with the $SO_3$ removing agent from the $SO_3$ removing agent supply unit or a flue gas in the vicinity of the supply unit that supplies the $SO_3$ removing agent.

15. The flue gas treatment device according to claim 14, wherein the return line is provided with a specific gravity separator configured to separate the removing agents from the precipitated ash utilizing specific gravity.

16. The flue gas treatment device according to claim 10, wherein the droplet supply unit is provided with a soot removal device configured to drop solids adhered to a periphery of the droplet supply unit.

17. The flue gas treatment device according to claim 10, wherein a unit configured to detect a concentration of $SO_3$ in the flue gas is provided between the precipitator and the desulfurization unit.

* * * * *